Nov. 21, 1944.                C. J. CRANE ET AL                2,363,401
                         NAVIGATIONAL CONTROL MEANS
                            Filed June 18, 1938            3 Sheets-Sheet 1
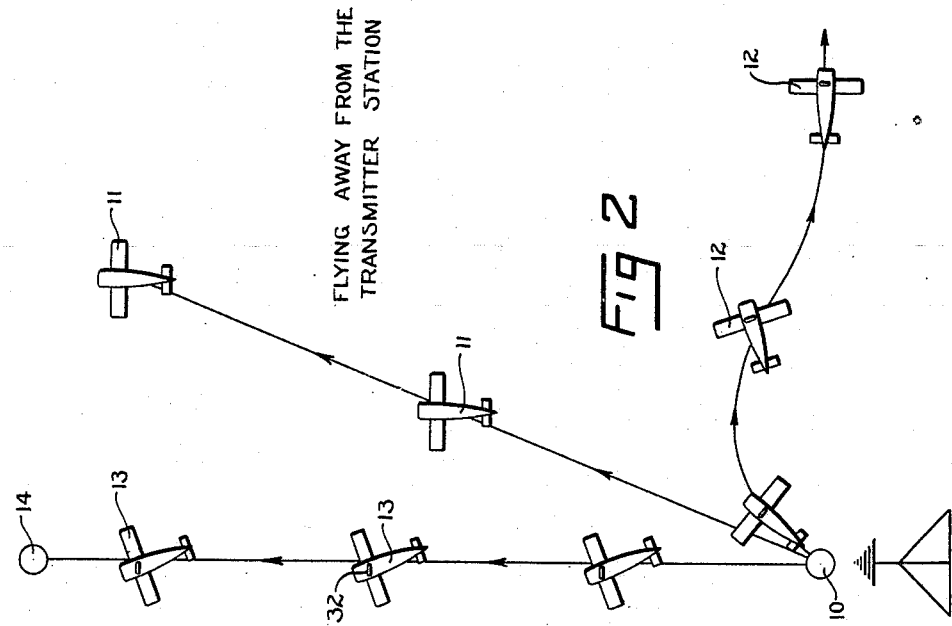
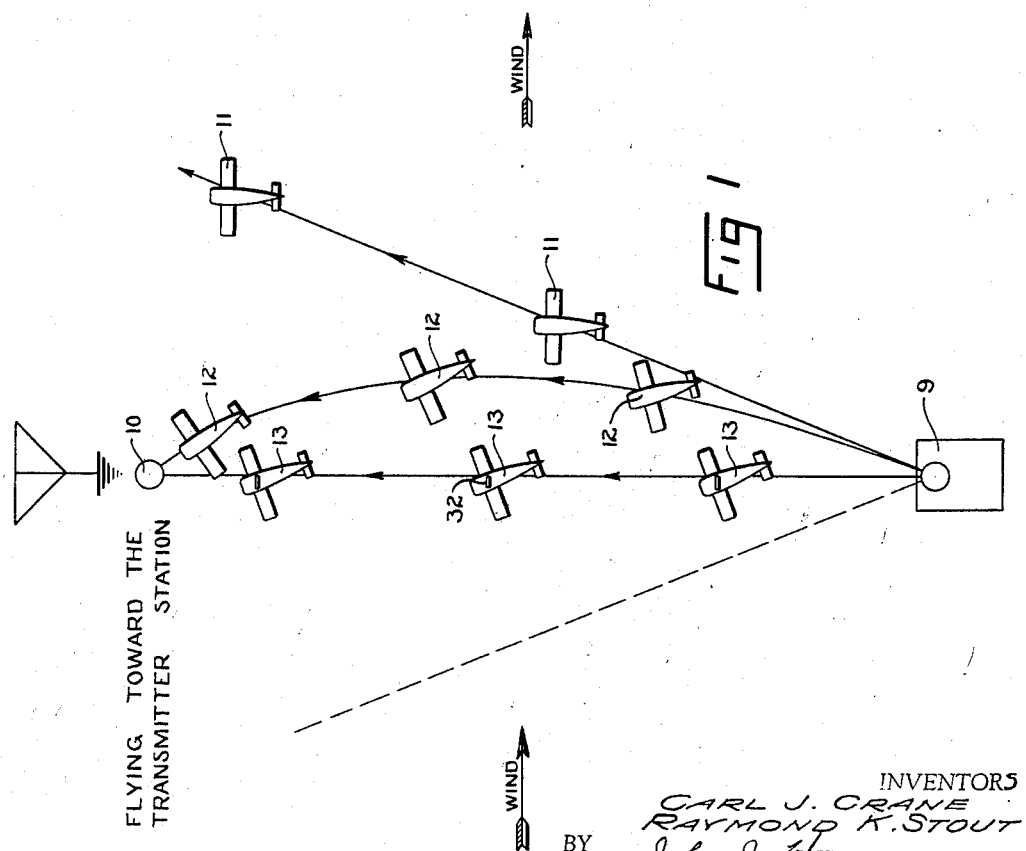
INVENTORS
CARL J. CRANE
RAYMOND K. STOUT
BY
ATTORNEYS

INVENTORS
CARL J. CRANE
RAYMOND K. STOUT
BY
ATTORNEYS

Nov. 21, 1944.  C. J. CRANE ET AL  2,363,401
NAVIGATIONAL CONTROL MEANS
Filed June 18, 1938   3 Sheets-Sheet 3

INVENTORS.
CARL J. CRANE
RAYMOND K. STOUT
BY
ATTORNEYS

Patented Nov. 21, 1944

2,363,401

UNITED STATES PATENT OFFICE 2,363,401

NAVIGATIONAL CONTROL MEANS

Carl J. Crane and Raymond K. Stout, Dayton, Ohio

Application June 18, 1938, Serial No. 214,560

5 Claims. (Cl. 172—282)

This invention relates to direction finding and navigation equipment and more particularly to apparatus for automatically controlling the course and heading of a craft, such as an aircraft or marine vessel.

Direction finders or radio compasses are extensively used in aerial and marine navigation, and indicating means are ordinarily connected in circuit with the radio compasses for showing when the craft is on course, when it deviates from the course, and the direction of such deviation. The navigator or pilot can manually maintain the craft on a course in response to the indications received, or the indications may be utilized to control automatic means for keeping the craft on course. In the copending case of Crane and Stout, Serial No. 95,042, filed August 8, 1936, means are shown which enable a pilot or navigator to tune his radio receiver to a particular transmitting station and the craft is automatically maintained on course in response to indications of the radio compass indicator without the pilot or navigator being required to make any manual adjustment of the control surfaces for correction of drift. The action of the radio compass indicator puts suitable relays into operation, which in turn adjust steering devices. These devices may be the well-known steering motors, or they may be some sort of mechanical control instrument such as a "gyroscopic pilot."

Under certain conditions, progress toward a given transmitting station, commonly termed "homing" in the case of flight, will be over a direct route from the starting point to the station. Other conditions, such as cross winds or marine currents, may cause an aircraft or ship to deviate from the direct route, and its path becomes curved as a result of correction for these deviations. The invention herein, later to be described in detail, discloses a novel method and means for automatically maintaining a craft on a direct course. An automatic pilot such as a gyro pilot is used in conjunction with a direction finder or radio compass having a left-right indicator of the ordinary type, which not only indicates the course of the craft but which also causes the automatic actuation of the gyro pilot to maintain the craft on course. In addition to the gyro pilot, other gyroscopic means are employed to rotate the directive antenna, such as a loop, of the radio compass in order to compensate for any side drift due to cross winds or marine currents. In this manner, the craft may be given the particular heading which will result in a direct course, regardless of such adverse factors.

One of the objects of this invention is to provide improved means for maintaining a craft such as a marine vessel or aircraft on a direct course.

Another object of the invention is to provide novel and automatic means of compensation for adverse wind or water conditions during the navigation of a craft on a desired course.

Another object is to provide novel and automatic means for shifting the loop antenna of a radio compass to compensate for any side drift of an associated craft.

Another object is to provide a novel and improved method of navigation for craft of the types earlier mentioned.

A still further object is to provide navigation equipment which is more efficient and dependable in use, which involves a minimum of moving parts, and which can be embodied in the usual aircraft or marine vessel without difficulty.

These and other objects will appear more fully in the detailed description of the invention which follows. Although three embodiments of the present invention are illustrated in the accompanying drawings, it is to be expressly understood that these drawings are for the purpose of illustration only, and are not to be construed as defining the scope of the invention, reference being had for this purpose to the appended claims. In the drawings, wherein like reference numerals refer to like parts, Fig. 1 is a diagrammatic representation of several types of flight with the common objective being a radio transmitting station, one of which types is in accordance with the present invention;

Fig. 2 is a similar representation of the same types of flight, proceeding away from the transmitting station;

Figures 3, 4:
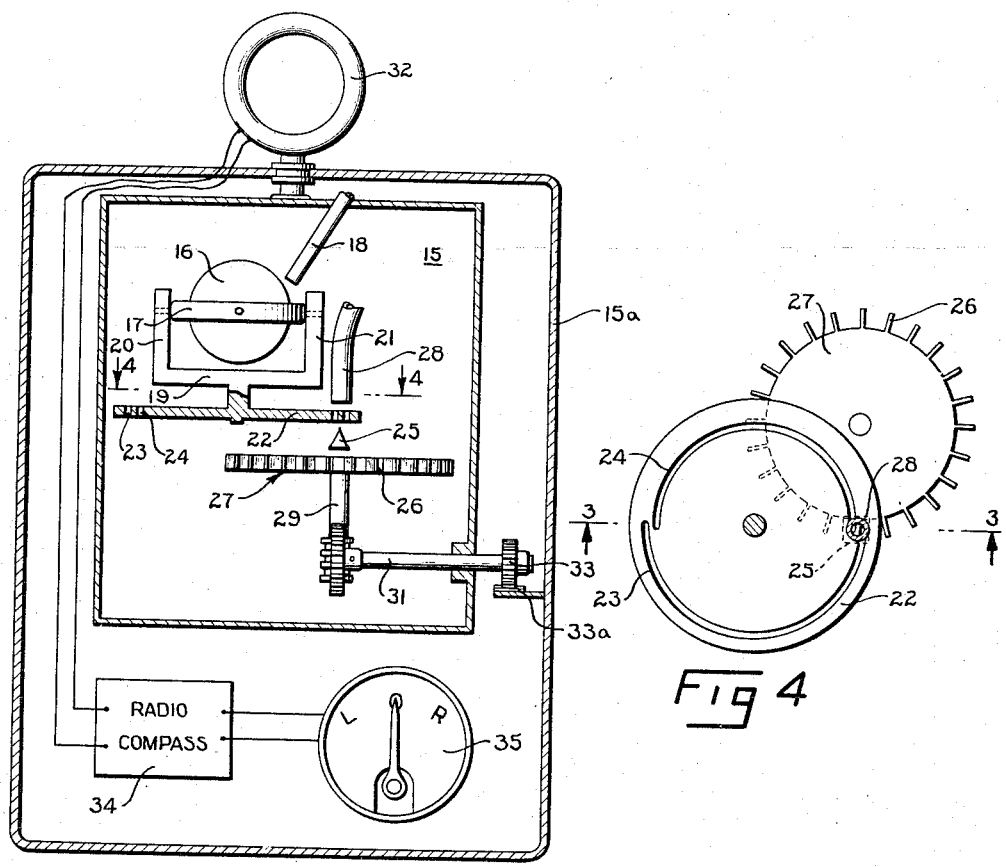
Fig. 3 is a diagrammatic elevational view, partly in section, of one type of drift corrector embodying the present invention, the section being taken on line 3—3 of Fig. 4.
Fig. 4 is a detail plan view, partly in section, of parts of the apparatus of Fig. 3, the view being taken substantially on line 4—4 of Fig. 3.

Referring now in more detail to Fig. 1, the numeral 9 indicates an airport which is the common starting point for three lines of flight, all having the radio transmitting station 10 as an objective. The line of flight indicated by aircraft 11 represents the course resulting from the control of an automatic pilot under the condition of a cross wind coming from the left, and shows a constant drift away from the objective. The automatic pilot will maintain any given heading of a craft, but repeated adjustment of heading is necessary to overcome the effect of side drift, and such adjustments are required of the navigator in these instances. A second line of flight is designated by the aircraft 12, indicating the course of a craft equipped with the prior form of radio compass and automatic pilot. This form employs a directional antenna such as a loop and a radio compass with automatic means acting in response to indications thereof for controlling the automatic pilot. Due to the cross wind, the heading of the craft must be constantly changed in order to bring the craft to the desired objective. While the heading is changed automatically by the above mechanism, it is changed only after a deviation from the true course has occurred. The path of the flight is curved and the degree of curvature is dependent upon the force of the cross wind. The straight line flight illustrated by the aircraft 13 represents that of a craft equipped with the novel and improved mechanism to be herein disclosed. Under this present system of control, the course is not the resultant of a series of corrections for error in course, but is a straight line, due to instantaneous and automatic compensation for the cross wind which would otherwise produce an error in the course. The prior control system described in connection with the flight illustrated by aircraft 12 corrects the course of the craft only after an error has developed, while the system comprising this invention initially compensates for the cross wind otherwise resulting in error, and so prevents the occurrence of errors or deviations from course.

The flight paths of the respective aircraft equipped with the same control systems as described are shown in Fig. 2, where the objective 14 is away from the transmitting station 10. The aircraft 11 is equipped solely with an automatic pilot, and it will be observed that its course is exactly the same as shown in Fig. 1. It is characteristic of the automatic pilot to maintain constant heading rather than constant course, and since there is no radio control, the flight will be the same whether the craft is approaching or leaving the field containing transmitting station 10. The flight of aircraft 12 in Fig. 2 represents that of a craft having an automatic pilot and a radio compass with a directional antenna such as a loop. The course is altered by automatic means acting in response to indications of the radio compass. It may be seen that this flight is radically different from that of the corresponding craft in Fig. 1. The effect of the cross wind is to blow the craft off course until a point is reached where it is proceeding directly with the wind. The flight illustrated by aircraft 13, which has the control system of the present invention, is a straight line or a direct course toward the objective 14. As formerly mentioned, the direct course results from the initial compensation against the effect of the cross wind.

Referring now in more detail to the mechanical structure and component parts of the system in accordance with this invention, there is shown in Fig. 3 a drift corrector enclosed in a housing 15 which is rotatably supported within the associated craft 15a. A gyroscope 16 is freely suspended on the gimbal ring 17, and is rotated by air from a jet 18 connected to suitable pneumatic means, not shown, in a manner well understood in the art. A yoke member 19 has arms 20 and 21 which movably support the horizontal gimbal ring 17. The yoke carries integrally or otherwise a rotatably mounted disc 22 having opposing slots 23 and 24 slightly greater than a semicircle in extent. As may be seen more clearly in Fig. 4, these slots are disposed on different radii and overlap slightly at the ends to define an intervening rib. Centrally positioned under the overlapping portion of the slots 23 and 24 is an air deflector 25 which overlies the blades 26 of an air turbine 27. A jet 28, leading from suitable pneumatic means (not shown), directs air downwardly through slots 23 and 24 upon the air deflector 25. The shaft 29 of turbine 27 is suitably connected by suitable gearing, such as the worm and wheel shown, to a shaft 31 which is provided at its outer end with a gear 33 that meshes with an arcuate rack 33a fixed to the body of craft 15a. A loop antenna 32 is mechanically connected to and rotatable with drift corrector housing 15 and is electrically connected in a manner well known in the art to any suitable direction finder or radio compass 34 having its output connected to an indicator, such as the right-left indicator 35. By means of this indicator, a pilot or navigator may know when his craft is on course, when it deviates therefrom, and the direction of deviation.

When a craft is on course, with no cross wind conditions, the usual loop antenna 32 is positioned with its plane perpendicular to the line of flight. The drift corrector unit such as 15 is operable to rotate the loop antenna and maintain the same in a plane perpendicular to the line of flight upon a change of heading on the part of the associated craft. When the usual gyro pilot is used in conjunction with the radio compass, as described in connection with the beforementioned pending application, the heading of the craft will be automatically changed by means of the mechanism operating in response to off-course indications of the radio compass. The indications of the radio compass are effected by the relation of the plane of the loop antenna with respect to a line from the axis of the antenna to the received transmitting station. In the position of the present apparatus, as shown in Figs. 3 and 4, both the slots 23 and 24 are in the path of the air issuing from jet 28. An equal amount of air will strike each face of the deflector 25, and will establish a balance of pressure on the turbine vanes 26 to prevent rotation thereof. When the heading of the craft is changed, due to a cross wind, rotation of the disc 22 will cause either of the slots 23 or 24 to receive a greater proportion of the air from jet 28, with the result that there will no longer be an equal division of the air by the deflector 25, and the turbine 27 will be rotated, causing a rotation of the loop antenna 32 with respect to the craft.

When the craft is forced off-course by a cross wind, the right-left indicator 35 will show the deviation, as the plane of the loop antenna 32 will not be perpendicular to the line of the received transmitting station. Upon a deflection of the indicator needle, automatic means are set into operation (as disclosed in the above-mentioned application) to adjust the course set by the automatic pilot. This adjustment entails a change of heading, which causes the drift corrector unit 15 to operate and return loop antenna 32 to the proper relation with the transmitting station. The plane of the loop 32 now has a different angular relation to the craft. When the right-left indicator 35 shows an on-course indication, the craft is traveling on course, but in reality is headed slightly off course, and the angle of deviation in heading is determined by the force of the cross wind. This new heading is maintained according to this invention as long as the right-left indicator gives on-course indications. If the cross wind should become greater or less, so that a change in heading is necessary, to maintain the craft on course, the drift corrector unit 15 will each time be operated to change the angular position of the loop with respect to the craft. This change in the position of the loop is thus automatically made in such degree as will compensate for the drift due to the cross wind.

Figure 5:
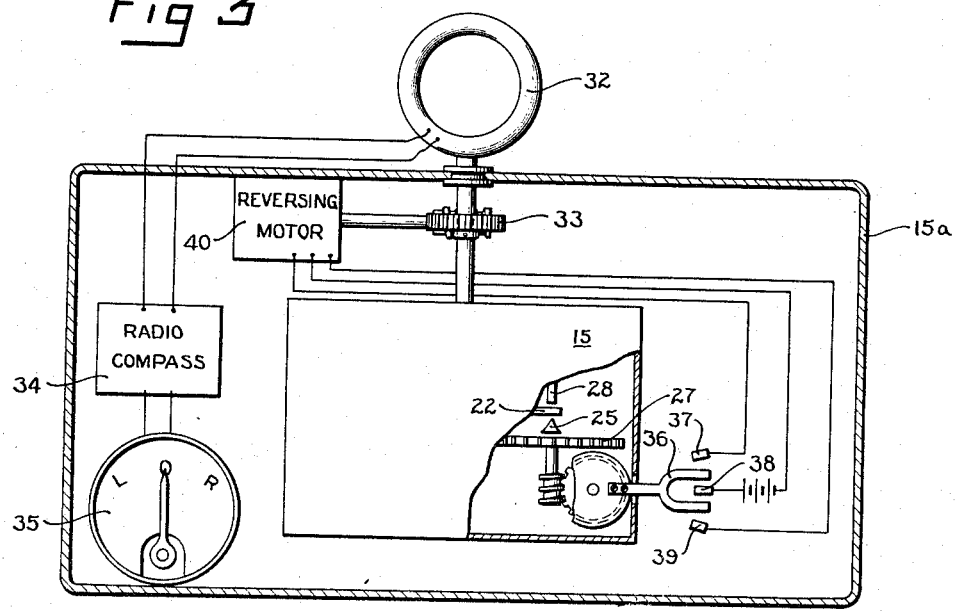
Fig. 5 is an elevational view of another embodiment of the invention, in which certain of the parts are represented diagrammatically.

Another embodiment of the invention is illustrated in Fig. 5, where the drift corrector unit 15 of Fig. 3 is shown in connection with a reversing switch and reversible motor for effecting the rotation of the loop antenna 32 in response to rotation of turbine wheel 27. Depending upon the direction of turbine rotation, the switch arm 36 will close either the contacts 37—38, or contacts 38—39. These contacts may lead to reversely wound fields in the motor 40, which control the direction of its rotation in a manner well understood. The operation of the other elements is identical with their operation as described in connection with Fig. 3.

Figure 6:
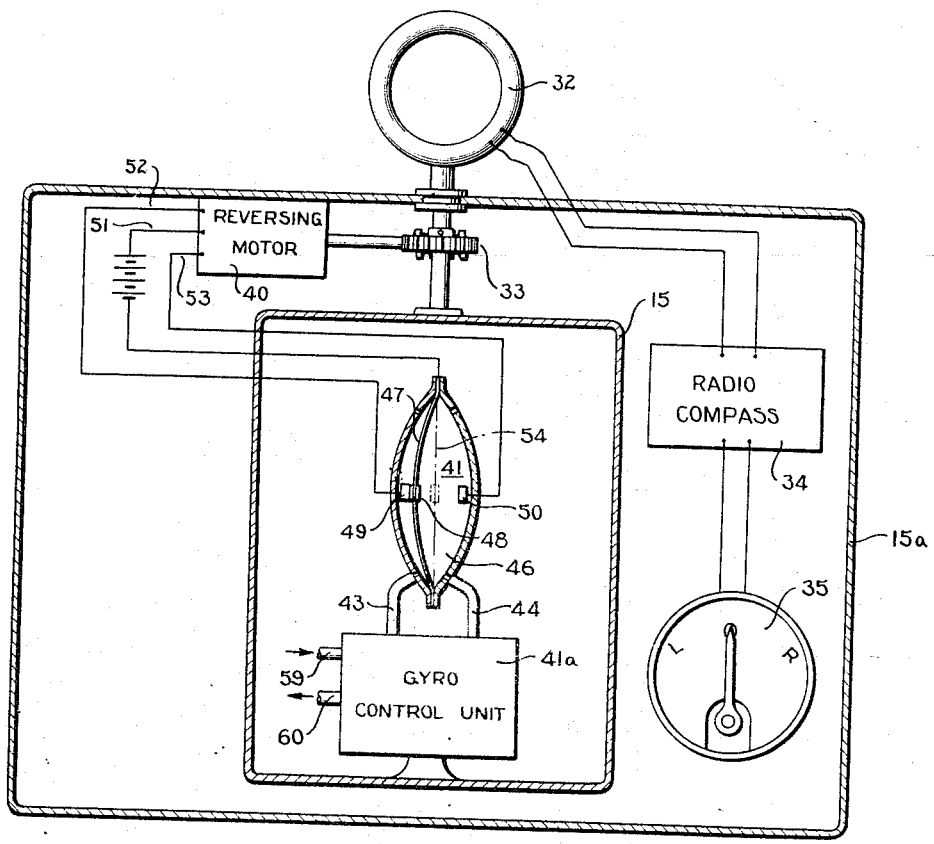
Fig. 6 is a diagrammatic representation of still another embodiment of the invention.

A modification of the foregoing structure is shown in Fig. 6, wherein an air relay controls a reversible motor. An air relay 41 of the type employed in conventional automatic or gyro pilots is connected with a gyro control unit 41a, by the air conduits 43 and 44 which lead to chambers 45 and 46 on opposite sides of the central diaphragm 47. An electrical contact 48 is mounted on the diaphragm where it may engage the adjacently positioned contacts 49 and 50. Conductors 51, 52 and 53 connect the contacts 48, 49 and 50, respectively, with a reversible motor 40. When the plane of the loop antenna 32 is perpendicular to the line joining the loop and the signalling station, the air pressures in chambers 45 and 46 are equal and diaphragm 47 is in neutral position, as indicated by broken line 54. Upon deviation of the craft from the desired course, the human or automatic pilot will change the heading of the craft, whereupon gyro control unit 41a will operate to cause unequal pressures in chambers 45 and 46, and diaphragm 47 will accordingly assume an off-neutral position, such as shown. The direction of movement of the diaphragm will depend upon whether the deviation of the craft from the desired course is right or left. As illustrated, contacts 48 and 49 are closed to effect the operation of motor 40 in such manner as to rotate loop antenna 32 in the proper direction in the same manner as described in connection with Fig. 5.

Figure 7:
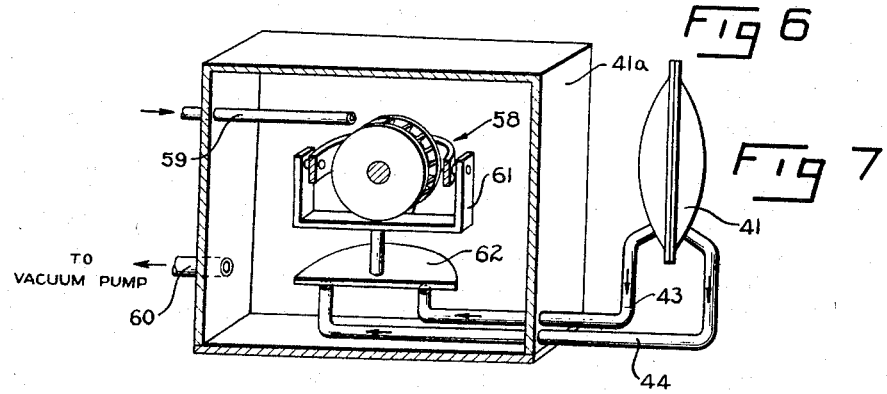
Fig. 7 is a diagrammatic isometric view of the gyro control unit of Fig. 6; and, Fig. 8 is line diagram showing one novel navigational system utilizing the invention.

A suitable gyro control unit for use in connection with air relay 41 is diagrammatically shown in Fig. 7. The rotor of a rotatably mounted gyroscope 58 is driven in a manner well known in the art by an air blast from conduit 59, said air blast being created by a vacuum pump (not shown) which evacuates control unit housing 41a through a conduit 60. Attached to the support 61 for gyroscope 58 and rotatable therewith is a semi-circular disc 62 which normally covers equal portions of the inner ends of conduits 43 and 44 that lead to air relay 41. As soon as the heading of the craft is changed by the human or automatic pilot for the purpose of making a correction to compensate for drift, disc 62 moves relative to conduits 43 and 44, the gyroscope and said disc remaining stationary while the drift corrector housing and hence conduits 43 and 44 rotate in azimuth with the craft. By reason of this relative movement, disc 62 closes one of the conduits 43 and 44 and opens the other, thereby causing a differential pressure in air relay 41 which is effective to actuate diaphragm 64 (Fig. 6) and hence close a circuit to reversing motor 40. The latter rotates loop 32 and drift corrector unit 15 in the proper direction until conduits 43 and 44 assume their normal position relative to disc 62.

Figure 8:
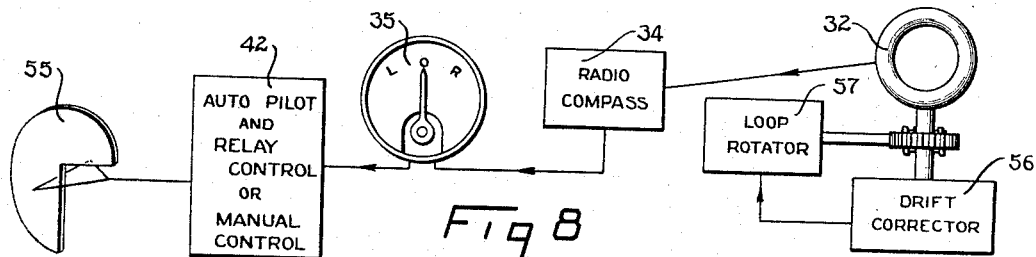

A study of Fig. 8 will show clearly one environment in which the drift corrector of the present invention may be utilized. In Fig. 8, there is shown loop antenna 32 connected to any conventional radio compass 34, the output of which is connected to a suitable indicator, such as a right-left indicator 35, which indicator controls an automatic pilot 42 in the manner set forth, for example, in the copending application above referred to, and the automatic pilot 42, in turn controls the disposition of a rudder member 55. In order to adjust the position of loop antenna 32 relative to the craft in the manner above described, so that a proper drift compensating heading may be maintained, a drift corrector unit 56, which may be similar to those illustrated in Figs. 3, 5 and 6, is provided, said drift corrector being adapted to shift the position of loop 32 in the proper manner whenever the human or automatic pilot acts to adjust rudder 55, and hence the heading of the craft. Drift corrector 56 is connected to loop rotator 57, of any suitable type, in order that directional changes made by automatic pilot 42 will act through drift corrector 56 to adjust loop 32 in order to set loop 32 at such an angle with respect to the aircraft that radio compass indicator 35 will give an on-course indication when the aircraft is at an angle of course-deviation-compensation sufficient to keep the craft on a direct course to its objective regardless of cross wind. It will be understood that the right-left indicator 35 may be used merely for showing conditions of course and the human pilot may observe the same and manually change his course in response to the indications without the aid of an automatic pilot. A drift corrector of the type shown in Fig. 3, for example, is independent of an automatic pilot and will operate to adjust loop 32 in such a manner that, when the craft is headed at a proper angle in order to maintain direct course towards its objective in the face of a cross wind, then loop 32 will be rotated to maintain its normal angular relation to the transmitting station or objective so that right-left indicator 35 will show the craft to be on course although in reality it is headed slightly off course.

The invention has been described as being used in conjunction with a gyroscopic pilot which is automatically controlled by mechanism put into operation by indications from a suitable radio compass indicator. However, the apparatus used in carrying out the invention might be employed in some other environment. It may be used in a vehicle such as an aircraft or marine vessel in which the course is manually maintained according to a gyroscopic or magnetic compass and in place of loop 32 there might be substituted an azimuth indicator so that the pilot could directly observe the angle of correction for drift necessary to bring him to his destination. In Fig. 6, a diaphragm 47 has been shown as carrying an electrical contact, but this is not the only means by which the circuit may be closed in response to movement of the diaphragm. For example the diaphrgam air relay 41 may carry a push rod for for operating a suitable switch at some point exterior to relay 41 rather than within the relay, as shown.

According to the novel method of the present invention, a vehicle such as an aircraft or marine vessel may be not only brought automatically to its destination but also automatically maintained on a direct course to its destination, adverse conditions such as tide and cross wind being automatically compensated for by varying the heading of the vehicle in an amount sufficient to maintain the most direct course under these conditions. It will be noted that this direct course is maintained whether the vehicle is approaching or receding from the transmitting station to which the radio compass is tuned. Thus, there has been provided a valuable improvement over the ordinary homing methods, since homing methods heretofore have been effective only when the course is toward a particular transmitting station and not away from the same, under adverse conditions of wind or current.

While only three embodiments have been shown, it is to be understood that the invention is not restricted thereto and that various changes may be made in the construction and arrangement of parts, as will occur to those skilled in the art. Although Figs. 1 and 2 show aircraft, it is to be understood that marine vessels might be shown as well, since the invention is equally adapted to use in the air or at sea. Other automatic pilots than the gyro pilot may be satisfactorily employed in carrying out the novel method of the invention, and it is to be understood that the invention is not restricted thereto. It will also be understood that the various electrical and air connections may be made in any manner well known in the art, the electrical connections to loop antenna 32 being by means of slip rings and brushes, for example. Reference will be had, therefore, to the appended claims for a definition of the limits of the invention.

What is claimed is:

1. In apparatus of the class described, a vehicle, a radio compass therein having a loop antenna, gyroscopic means for establishing a reference line for the heading of said vehicle, said means carrying air deflecting means, an air jet, and an air turbine associated with said deflecting means and air jet, said turbine being adapted to be rotated in response to variations of said vehicle from said reference line, rotation of said turbine causing rotation of said loop antenna in order to maintain the angular relation between said loop antenna and said reference line constant.

2. In a unit for aiding in the navigation of a vehicle, a radio compass having a directional antenna, gyroscopic means for noting the heading of the vehicle, said means carrying air deflecting means, an air jet positioned adjacent said air deflecting means, and an air turbine operatively associated with said air jet and adapted to be rotated thereby, said turbine being adapted upon rotation to cause rotation of said directional antenna.

3. In apparatus of the class described, a vehicle, a radio compass therein having a loop antenna, means for establishing a reference line for the heading of said vehicle, said means carrying air deflecting means, an air jet, an air turbine associated with said deflecting means and air jet, said turbine being adapted to be rotated in response to variations of said vehicle from said reference line, and means for causing rotation of said loop antenna, said means being rendered operative by rotation of said turbine in order to maintain the angular relation between said loop antenna and said reference line constant.

4. In apparatus of the class described, a vehicle, a radio compass therein having a loop antenna, means for establishing a reference line for the heading of said vehicle, said means carrying air deflecting means, an air jet, an air turbine associated with said deflecting means and air jet, said turbine being adapted to be rotated in response to variations of said vehicle from said reference line, and motor means operatively connected to said loop antenna for imparting rotary movement to the latter, said motor means being connected to said turbine to be actuated thereby in accordance with the direction of rotation of said turbine.

5. In a unit for aiding in the navigation of a vehicle, radio receiving means having an energy collecting means with directional characteristics, gyroscopic means for noting the heading of the vehicle, said gyroscopic means carrying air deflecting means, an air jet controlled by said deflecting means, and an air turbine operatively associated with said air jet and adapted to be rotated thereby, said turbine being adapted upon rotation to cause rotation of said collecting means.

CARL J. CRANE.
RAYMOND K. STOUT.